United States Patent
Hirai

[11] Patent Number: 5,953,570
[45] Date of Patent: Sep. 14, 1999

[54] DEVELOPING DEVICE FOR AN IMAGE FORMING APPARATUS

[75] Inventor: Atsuto Hirai, Ikoma, Japan

[73] Assignee: Minolta Co., Ltd., Osaka, Japan

[21] Appl. No.: 08/967,323

[22] Filed: Oct. 21, 1997

[30] Foreign Application Priority Data

Oct. 25, 1996 [JP] Japan .................................... 8-283674
Feb. 13, 1997 [JP] Japan .................................... 9-028804

[51] Int. Cl.$^6$ .................................................. G03G 15/09
[52] U.S. Cl. ........................................... 399/282; 399/267
[58] Field of Search ................................... 399/281, 282, 399/283, 272, 273, 275, 265, 252, 253, 267; 130/122, 106.6, 105

[56] References Cited

U.S. PATENT DOCUMENTS

| | | | |
|---|---|---|---|
| 4,331,757 | 5/1982 | Tanaka et al. ........................... | 430/122 |
| 4,568,625 | 2/1986 | Uchiyama et al. ................... | 430/122 X |
| 4,680,245 | 7/1987 | Suematsu et al. .................... | 430/122 X |
| 4,686,934 | 8/1987 | Kohyama ................................. | 399/282 |
| 5,337,124 | 8/1994 | Schmidlin et al. ..................... | 399/282 |

FOREIGN PATENT DOCUMENTS 63-065469 3/1988 Japan .
7-128983 5/1995 Japan .

*Primary Examiner*—Arthur T. Grimley
*Assistant Examiner*—Sophia S. Chen
*Attorney, Agent, or Firm*—Burns, Doane, Swecker & Mathis, LLP

[57] ABSTRACT

Developing device (3A) for use in an electrophotographic image forming apparatus such as copy machine includes a developer material (31) having toner particles (37) and carrier particles (39) and a housing (5) for containing the developer material. The housing includes a developer bearing member (21) and a toner bearing member (9) to form a give-and-take region (23) through which the toner particles are transferred to and from the developer bearing member. A packing density in the give-and-take region is equal to or more than 29.5%. The packing density is defined by the following equation:

$$P.D = 100[M/(D\rho)]$$

wherein
P.D: Packing density (%)
M: Amount of developer material per unit area on first developer member (mg/cm$^2$)
D: Distance between developer and toner bearing members (cm)
$\rho$: Unit weight of developing material (g/cm$^3$).

20 Claims, 7 Drawing Sheets

DEVELOPING DEVICE FOR AN IMAGE FORMING APPARATUS

FIELD OF THE INVENTION

The present invention relates to a developing device for use in an electrophotographic image forming apparatus such as copy machine.

BACKGROUND OF THE INVENTION

Japanese Patent Laid-Open Publication No. 7-128983 discloses a developing device for use in an electrophotographic image forming apparatus. The developing device includes a cylindrical toner bearing member (i.e., toner roller) opposed to a photosensitive member for bearing toner particles therearound and a developer bearing member (i.e., developer roller) spaced a slight gap away from the toner bearing member for bearing a two-component developer material consisting of carrier particles as well as toner particles. According to the developing device, the toner particles supported on the developer bearing member are transferred to the toner bearing member in a transfer region where toner bearing member opposes to the developer bearing member. Then, the toner particles so transferred to the toner bearing member are supplied to the photosensitive member to develop an electrostatic latent image formed on the photosensitive member into a visualized image in a developing region where the toner bearing member opposes to the photosensitive member.

Figure 5A:
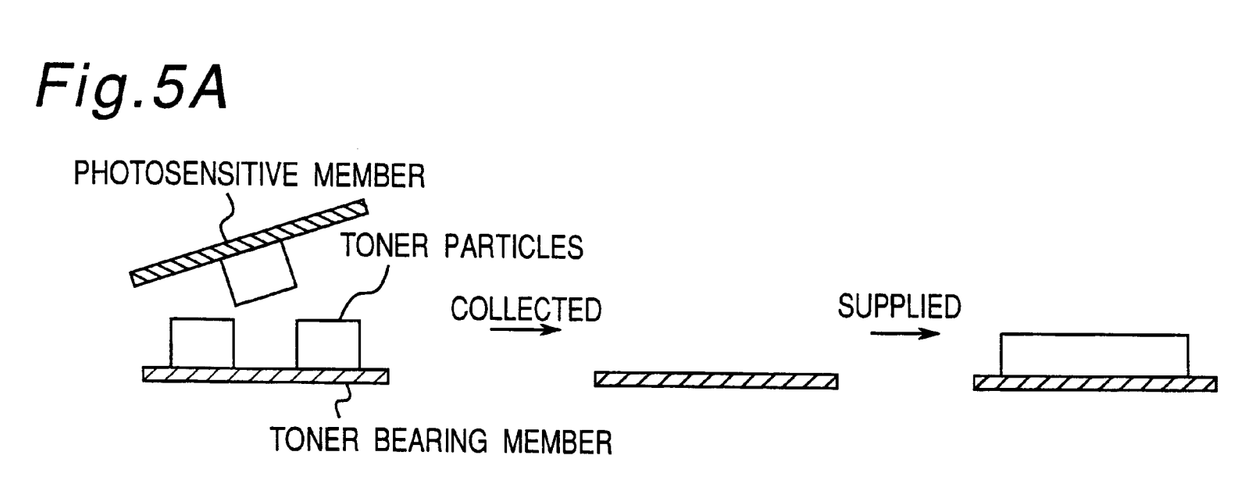
FIGS. 5A and 5B show processes for supplying toner particles to the toner bearing member.

This type of developing device requires each incremental peripheral portion of the toner bearing member moving past the developing region to bear a constant amount of toner particles thereon to ensure the visualized image to have a constant density. To this end, two techniques are proposed in the art. One technique, which is illustrated in FIG. 5A, is to remove all the toner particles supported on the toner bearing member therefrom after it has moved past the developing region and then to provide the toner bearing member again with the toner particles in the transfer region where the toner bearing member confronts the developer bearing member. The other technique, which is illustrated in FIG. 5B, is to supply toner particles only to portions on the toner bearing member from which the toner particles has been transferred to the photosensitive member.

The former technique, however, requires the toner particles that have removed from the toner bearing member to be re-mixed into the two-component developer material in a space of certain volume. This results in the developing device to be larger in size and complicated in structure. Also, using a scraper to remove the toner particles from the toner bearing member will disadvantageously result in an fusing of toner particles both on the scraper and toner bearing member at which the scraper contacts with the toner bearing member and scratches on the toner bearing member by the contact with the scraper. Instead, other members such as collecting roll and brush roll are proposed to remove the toner particles from the toner bearing member, which further requires the use of the scraper for removing toner particles from the collecting roll or brush roll, also resulting in the developing device to be complicated and larger in size and the fusing of the toner.

Figure 5B:
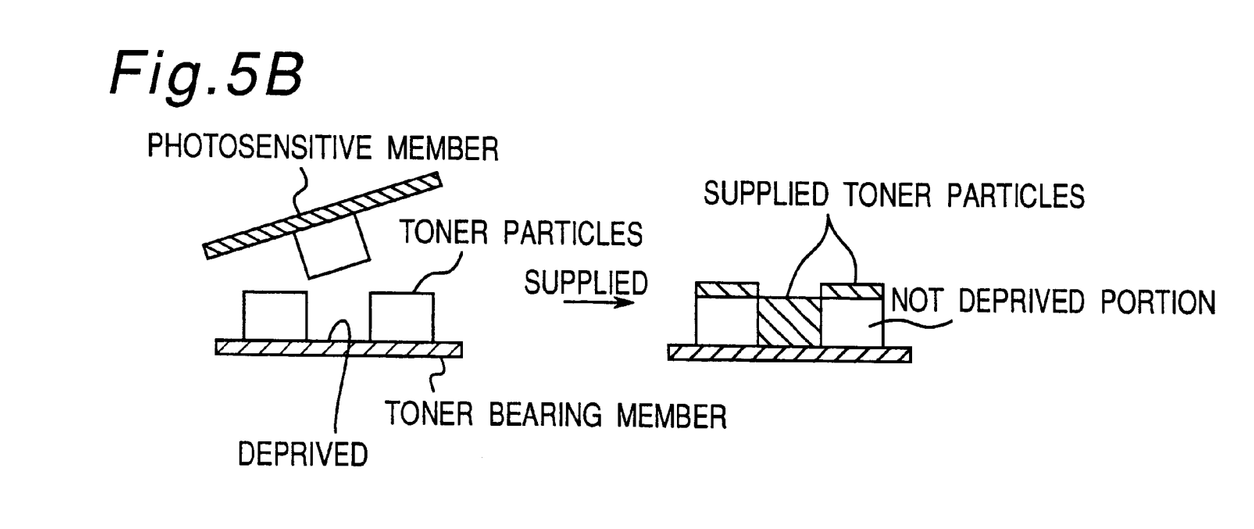

The latter technique, on the other hand, as illustrated in FIG. 5B, the toner particles are also supplied to one portions that still bear toner particles even after the previous developing process as well as other portions that that have been deprived of toner particles therefrom in the previous developing process. This results in an unevenness of the amount of toner particles on the toner bearing member, adversely superimposing a pattern that corresponds to the previously visualized image onto the newly developed image. Also, the toner particles that have not consumed for developing can remain unused for a long period of time to be stressed by the continuous contact with the photosensitive drum, which may result in the fusing of toner on the toner bearing member.

SUMMARY OF THE INVENTION

The present invention, which is directed to a developing device for use in an electrophotographic image forming apparatus such as copy machine, includes a developer material having toner particles and carrier particles. The toner particle and carrier particles are so charged that they have different polarities. A housing is provided for containing the developer material. The housing includes therein a first bearing member for bearing the developer material and a second bearing member for bearing the toner material. The second bearing member is opposed to the first bearing member with leaving a gap from the first bearing member to form a give-and-take region therebetween through which the toner particles are transferred to and from the first bearing member. In this developing device, a packing density in the give-and-take region is designed to be equal to or more than 29.5%. The packing density is defined by the equation:

$$P.D = 100[M/(D\rho)]$$

wherein
- P.D: Packing density (%)
- M: Amount of developer material per unit area on first bearing member mg/cm$^2$
- D: Distance between first and second bearing members (cm)
- $\rho$: Unit weight of developer material (g/cm$^3$)

According to the invention, in the give-and-take region, the toner particles on the first bearing member can be well transferred to and from the second bearing member, without using any member such as scraper, ensuring to reproduce a high quality image free from previously developed image pattern.

In another aspect of the invention, the developing device includes a first bearing member and a second bearing member. The first bearing member includes a roll-like first rotatable member while the second bearing member has a second rotatable member within the housing. The first rotatable member includes a plurality of magnetic poles. The second rotatable member is disposed to oppose the first rotatable member with leaving a gap therebetween to form a give-and-take region. The plurality of magnetic poles form magnetic lines extending across said give-and-take region along a tangential direction of the first rotatable member.

With this arrangement, the packing density will be increased in the give-and-take region. Also, the toner particles are well transferred between the first and second rotatable members without using any member such as scraper, ensuring to reproduce a high quality image free from previously developed image pattern.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
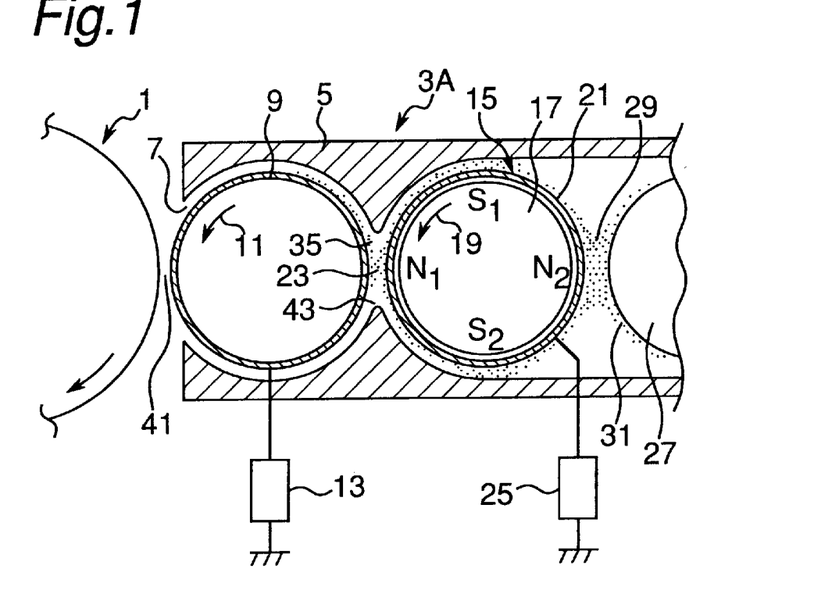
FIG. 1 is a partial elevational sectional view of a developing device of the first embodiment.
Figure 2:
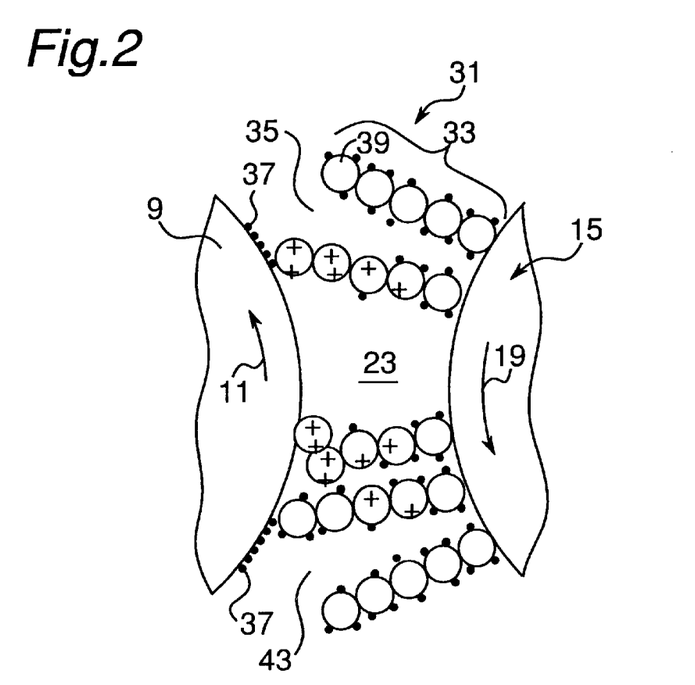
FIG. 2 is an enlarged sectional view showing a movement of toner particles between toner and developer bearing members.

With reference to the drawings, particularly in FIGS. 1 and 2, there is shown in part an image forming apparatus such as copy machine. The apparatus includes a rotatably supported photosensitive member or drum, generally indicated by reference numeral 1, for bearing an electrostatic latent image on an outer peripheral surface thereof. The image forming apparatus further includes a developing device, generally indicated by reference numeral 3A, for developing the electrostatic latent image into a visualized image. The developing device 3A includes a housing 5 preferably made of plastic members. The housing 5 has an opening 7 confronting the photosensitive drum 1. In the vicinity of the opening 7, a toner bearing member 9 or roller is mounted for rotation in a direction indicated by reference numeral 11.

The toner bearing member 9 is not limited to the roller, but may be replaced by other members, such as an endless belt rotatably supported by a plurality of rollers or a film sleeve supported by a roller arranged therein. The roller may be made of metal such as aluminum or stainless steel. Also, the metal roller may be covered at an peripheral surface thereof with elastic material such as synthetic resin. Further, although the toner bearing member is out of contact with the photosensitive member 1, it may be held in circumferential contact with the photosensitive member 1.

The toner bearing member 9 is electrically connected with a power supply 13 so that a certain bias is supplied to the toner bearing member 9. The bias may be a composite signal including a DC voltage of about −300 volts and an AC voltage having a frequency of about 8 kilo-hertz and a peak-to-peak voltage of about 2.6 kilo-volts.

The housing 5 further includes therein a developer bearing member 15 on one side opposite to the photosensitive member 1, with leaving a distance of D from the toner bearing member 9. The developer bearing member 15 includes a magnetic member 17 and a roller 21 which surrounds the magnetic member 17. The magnetic member 17 is fixed to the housing 5 while the roller 21 is supported for rotation in the same direction, indicated by reference numeral 19, as the rotational direction 11 of the toner bearing member 9. The magnetic member 17 has a plurality of magnetic poles N1, S1, N2 and S2 arranged at the peripheral portion thereof in this order along the rotational direction 19 and, in particular, the magnetic pole N1 is disposed in the vicinity of a region 23 (hereinafter referred to as "give-and-take region") where the toner bearing member 9 confronts the developer bearing member 15. The roller 21 is electrically connected with a power supply 25 so that a bias having a DC voltage of about −500 volts, for example, is applied to the roller 21 to form an electric field between the roller 21 and the toner bearing member 9.

A developer supply member 27, such as bucket roller, is disposed on one side opposite to the toner bearing member 9 so that a two-component developer material 31 having magnetic carrier particles and non-magnetic toner particles, well mixed together at a certain rate and triboelectrically charged into different polarities, is supplied from the developer supply member 27 onto the developer bearing member 15 at a region 29 (hereinafter referred to as "developer supply region") where the developer supply member 27 confronts the developer bearing member 15.

The toner particle has a smaller in size than the carrier particle. Also, in this embodiment, the toner and carrier particles are so designed that the toner particles are negatively charged while the carrier particles are positively charged when they are mixed together, thereby negatively charged toner particles are electrically attracted on the positively charged carrier particles as shown in FIG. 2.

In operation of the developing device 3A so constructed, the developer material 31 is supplied from the developer supply member 27 onto the developer bearing member 15 in the developer supply region 29. The developer material 31 is then held on the outer peripheral surface of the developer bearing member 15 with the aid of a magnetic force generated from the magnetic member 17 and transported in the direction 19 as the roller 21 rotates. The developer material 31 on the developer bearing member 15 forms magnetic brushes 33 (see FIG. 2) extending along the magnetic lines generated by the magnetic member 17.

Then, the developer material 31 is transported into the give-and-take region 23 where it is exposed to the magnetic field formed between the toner bearing member 9 and the developer bearing member 15. In this give-and-take region 23, as best shown in FIG. 2, the negatively charged toner particles 37 is electrically attracted to the toner bearing member 9 which is electrically higher than the developer bearing member 15, in a supply region 35 located on the upstream side of a position where the toner bearing member 9 confronts the developer bearing member 15. The carrier particles 39, on the other hand, remain on the developer bearing member 15 by the magnetic force from the magnetic member 17. Also, the carrier particle deprived of toner particles still hold the positive charge therein.

The toner particle 37 so supplied to the toner bearing member 9 is transported with the rotation of the toner bearing member 9 in the direction 11 into the developing region 41 where some toner particles 37 are transferred onto the photosensitive member 1 to develop the electrostatic latent image into the visualized image. After passing through the developing region 41, the remaining toner particles 37 are transported again into the give-and-take region 23.

In the give-and-take region 23, particularly in a collect region 43 located on the downstream side of the region 23 with respect to the rotational direction 19, the carrier particles 39 on the developer bearing member 15, having been deprived of toner particles 37 in the upstream supply region 35 and having positive charge, mechanically capture and electrically attract the remaining toner particle 37 on the toner bearing member 9.

The toner particles 37 so collected onto the developer bearing member 15 is transported along with the carrier particles 39 by the rotation of the developer bearing member 15 in the direction 19 while the collected toner particles 37 are mixed again with the carrier particles 39.

Preferably, the magnetic member 17 includes a pair of adjacent magnetic poles having the same polarity in a region located on the upstream side of the developer supply region 29 with respect to the rotational direction 19, thereby releasing all the developer material 31 from the developer bearing member 15 toward the developer supply member 27. This allows the well mixed developer material 31 to be supplied from the developer supply member 27 onto the developer bearing member 15 in the developer supply region 29.

Advantageously and preferably, a member capable of providing the toner and carrier particle with respective charges is mounted to bring into contact with the developer material on the developer bearing member 15 in a region from the developer supply region 29 to the give-and-take region 23 with respect to the rotational direction 19, improving the charging and mixing both of the toner and carrier particles 37 and 39.

According to the embodiment, the toner particles 37 that have not used for developing in the developing region 41 are collected in the give-and-take region 23 from the toner bearing member 9 to the developer bearing member 15. The developer bearing member 15 releases the collected toner particles 37 as well as the carrier particles 39 and then is re-supplied with suitably mixed toner and carrier particles in the developer supply region 29. Therefore, no pattern corresponding to the previously developed image will exist in a layer of toner particles on the toner bearing member, preventing the pattern from being superimposed on the visualized toner image on the photosensitive drum 1.

Advantageously, a rotational speed of the developer bearing member 15 is equal to or more, most preferably 1.4 times or more, than that of the toner bearing member 9, allowing the toner particles to be supplied and collected more efficiently.

Discussions will be made to a relationship of a toner supply from the developer bearing member 15 to the toner bearing member and a packing density (P.D) of developer material in the give-and-take region 23, the packing density (P.D) being defined by the following equation (1):

$$P.D = 100[M/(D\rho)] \quad (1)$$

wherein
P.D: Packing density (%)
M: Amount of developer material per unit area on developer bearing member mg/cm$^2$
D: Distance from toner bearing member to developer bearing member (cm)
$\rho$: Unit weight of developer material (g/cm$^3$).

Tests were conducted under four conditions shown in the following table:

| TEST NO. | D (cm) | $\rho$ (g/cm$^3$) | M (mg/cm$^2$) | P.D. (%) |
|---|---|---|---|---|
| 1 | 0.07 | 5.0 | 95.6 | 27.3 |
| 2 | 0.07 | 5.0 | 73.9 | 21.1 |
| 3 | 0.07 | 5.0 | 114.1 | 32.6 |
| 4 | 0.07 | 5.0 | 120.4 | 34.4 |

Figure 3:
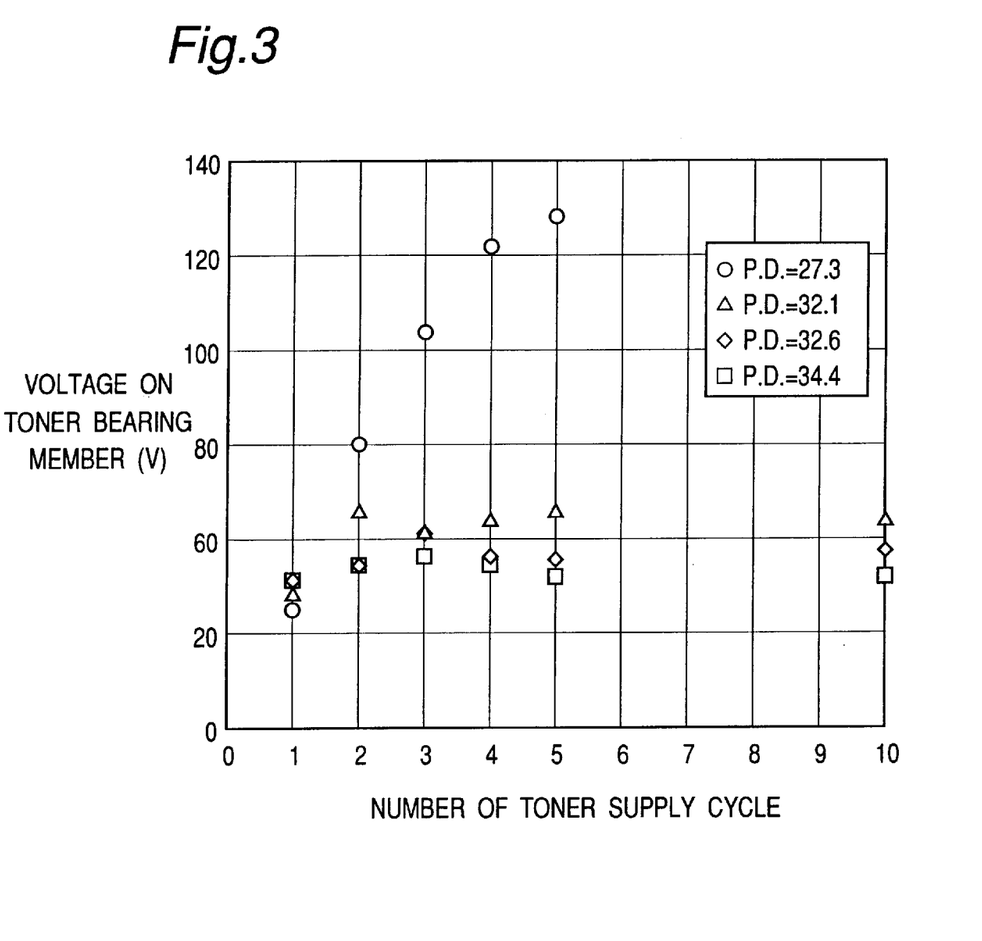
FIG. 3 is a graph showing a relationship between the number of toner supply cycles and a surface voltage of the toner bearing member.

Through the tests, a relationship between the number of cycles that a portion of the toner bearing member has passed through the give-and-take region and surface voltages of the toner bearing member was obtained. Note that the surface voltage has an intimate relationship with an amount of toner particles supported on the toner bearing member, in which the surface voltage increases as the amount of toner particles increases. The results are graphed in FIG. 3. The graph shows a tendency that the amount of toner particles on the toner bearing member increases as the packing density increases in the case that the cycle number is one. The amount of toner particle on the toner bearing member tends to stabilize if the cycle number is three or more except for the case that the packing density is 27.3%.

Using the results, determined was stability of amount of toner particles on the toner bearing member for each of the packing densities described above. The stability is defined by the following equation (2):

$$S = 100[S(1)/S(10)] \quad (2)$$

wherein
S: Stability
S(1): Amount of toner particles on a portion of toner bearing member after the portion has passed through the give-and-take region once
S(10): Amount of toner particles on a portion of toner bearing member after the portion has passed through the give-and-take region ten times Note that, for the case that the packing density is 27.3%, the stability is determined using S(5) in place of S(10), S(5) being the amount of toner particles on the portion of toner bearing member after the portion has passed through the give-and-take region five times.

Figure 4:
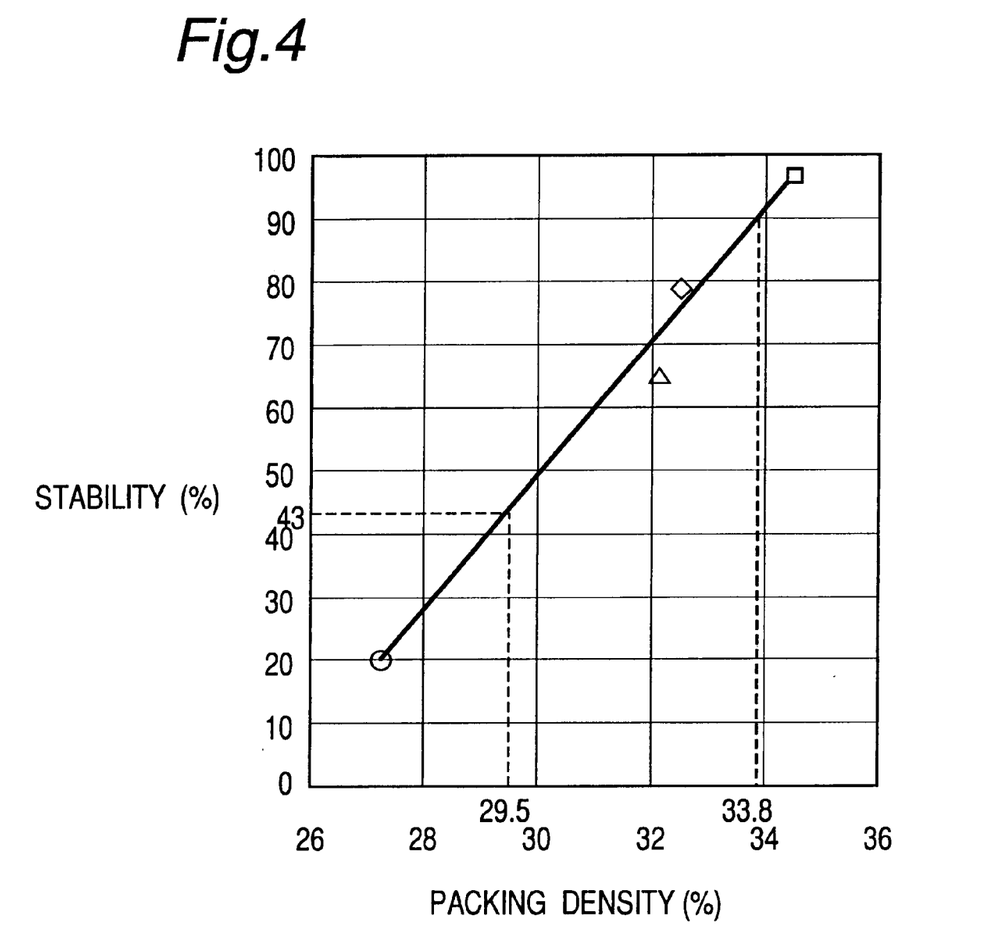
FIG. 4 is a graph showing a relationship between a packing density in the give-and-take region and a stability of adherence of toner particles.

The determined stabilities for respective packing densities are graphed in FIG. 4, indicating that the stability increases in proportion to the packing density.

In view of above, it is clear that the increased packing density in the give-and-take region will improve the ability for supplying toner particles from the developer bearing member to the toner bearing member.

Further discussions will be made to a suitable range of packing density. Generally, when using black toner particles, a density of the toner image obtained from a quantity of light reflected at the toner image, i.e., reflective density, has a proportional relationship with the amount of toner particles per unit area in the toner image but, once the amount of toner particles exceeds a certain threshold, the reflective density tends to stabilize to a certain value. The amount of toner particles at the threshold is generally referred to as saturated amount of toner particles. If the amount of toner particles in the toner image is more than the saturated amount, the difference in the amount is incognizable by the human eyesight. Also, it is understood that unwanted toner deposition will appear to deteriorate the quality of the reproduced image if the deposited amount of toner particles is in excess of 0.7 mg/cm$^2$, i.e., upper-limit, while a portion having lower density, e.g., scratched pattern, will appear in the reproduced image if the deposited amount of toner particles is lower than 0.4 mg/cm$^2$, i.e., lower-limit. Substituting the upper-limit (0.7 mg/cm$^2$) and lower-limit (0.4 mg/cm$^2$) for S(10) and D(1) in equation (2), respectively, will results in a stability of 43%. Then, the corresponding packing density of 29.5% is obtained by the use of graph in FIG. 4. The packing density of 29.5% is a threshold that ensures the image free from scratching pattern to be reproduced even when the portion of the toner bearing member moves past the give-and-take region only once.

For color toner particles other than black color toner particles, no corresponding saturated amount of toner particles exists so that the reflective density will increase as the deposited amount of color toner particles increases. It is understood, however, that the difference in the amount of color toner particles can be recognized by the human eyesight when the stability is less than about 90%. Therefore, it is understood from FIG. 4 that, when using color toner particles, the packing density is preferably set to be more than 33.8%.

Another test was conducted to observe the transferring of toner particles in the give-and-take region. In this test, the distance D between the toner bearing member and the developer bearing member was adjusted to 0.7 mm. The bias voltage of the toner bearing member was higher than that of developer bearing member by +200 volts and AC voltage having a frequency of 8 kilo-hertz and a peak-to-peak voltage of 2.6 kilo-volts was applied therebetween. The toner bearing member and the developer bearing member were rotated at respective velocities of 130 mm/sec and 182 mm/sec. The amount of charge of toner particles was adjusted to 5 $\mu$C/g and the packing density was designed to 34.4%. As a result, it was observed that the toner particles were well supplied and collected in the give-and-take region, reproducing a high quality image having a constant density.

According to this embodiment, in the give-and-take region where the toner bearing member confronts the developer bearing member, the toner particles on each of the incremental portions of the toner bearing member that have moved past the developing region are well collected onto the developer bearing member and then the incremental portions are well supplied with another toner particles, without using any member such as scraper that contacts with the toner bearing member.

With reference to FIGS. 6 to 9, another embodiment of the invention will be described hereinafter. In these drawings, the corresponding reference characters are provided for parts that correspond those illustrated in FIGS. 1 and 2. The construction of the developing device 3B of the embodiment is similar to that of the developing device 3A of the previous embodiment except for some portions.

Figure 6:
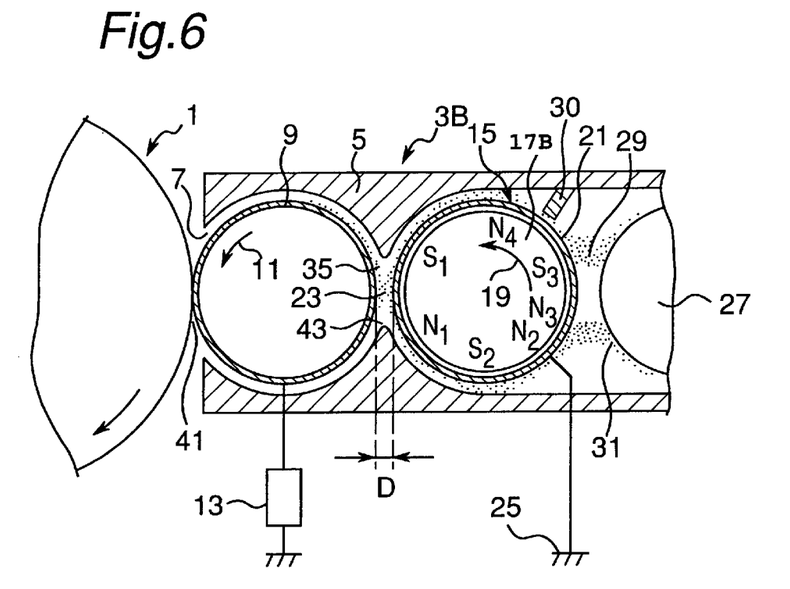
FIG. 6 is a partial elevational sectional view of a developing device of the second embodiment.
Figure 9:
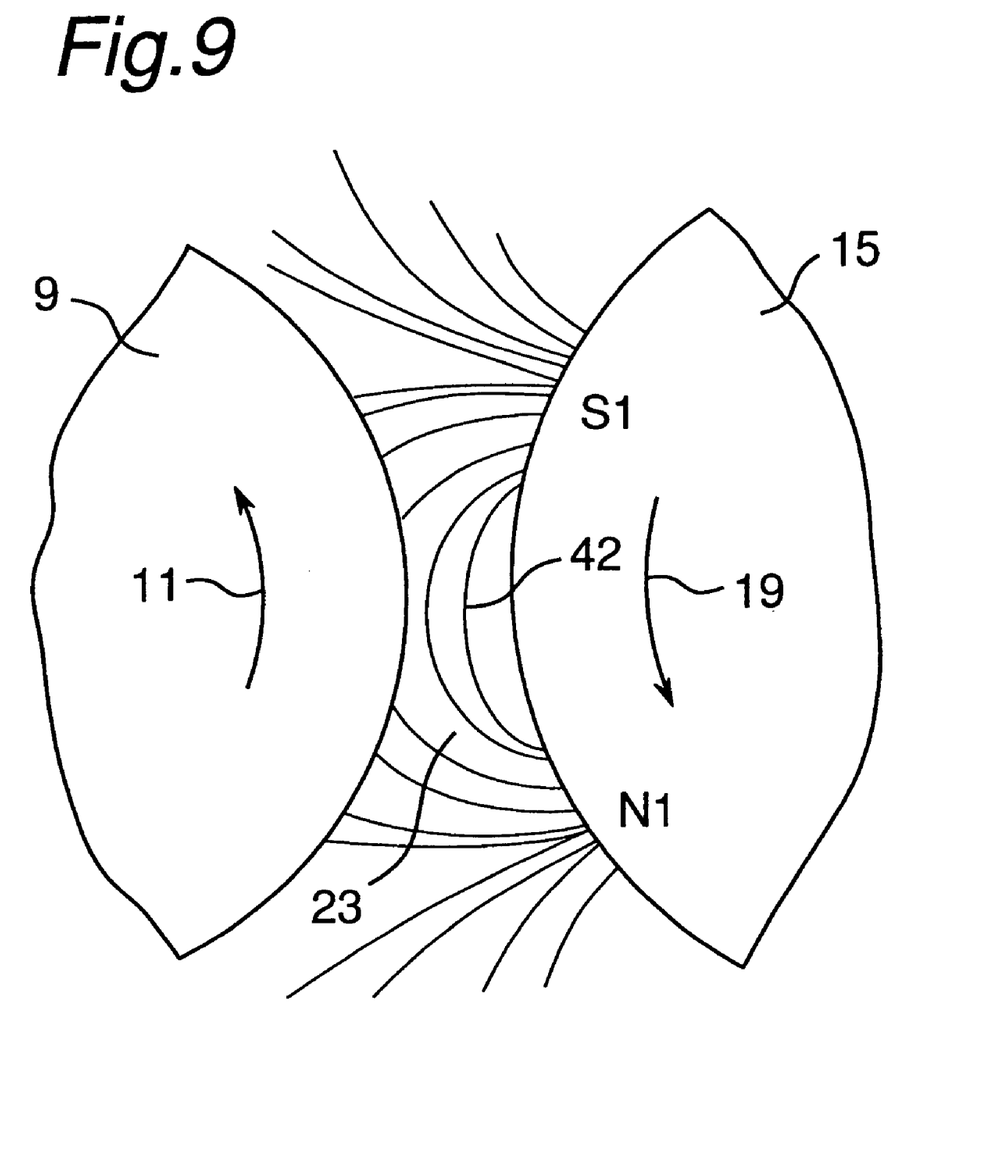
FIG. 9 shows magnetic lines formed in the give-and-take region of the developing device of the second embodiment.

Specifically, a magnetic member 17B includes a plurality of magnetic poles, i.e., S1, N1, S2, N2, N3, S3 and N4, in an outer peripheral surface thereof. Among these magnetic poles, one magnetic pole S1 playing an important role in the give-and-take operation is disposed on the upstream side of the give-and-take region 23 with respect to the rotational direction of the developer bearing member 21 while the other magnetic pole N1 which cooperates with the magnetic pole S1 to form a magnetic field in the give-and-take region 23 is arranged on the downstream side of the give-and-take region 23. Magnetic force lines in the magnetic field are illustrated in FIG. 9 in which the magnetic force lines in the give-and-take region 23 extend along peripheral direction of the developer bearing member 21 while the magnetic force lines above the magnetic poles extend radially outwardly from the developer bearing member 21. In addition, the developer bearing member 12 is grounded so that an electric field is formed between the developer bearing member 21 and the toner bearing member 9.

Also, the pair of neighboring magnetic poles N2 and N3 having the same polarity are disposed close to each other on the upstream side of a position where the developer bearing member 21 confronts the developer supply member 27 with respect to the rotational direction of the developer bearing member 12 so that the developer material 31 transported can be readily released from the developer bearing member 21 by a repelling force generated by the neighboring magnetic poles N2 and N3.

A plate 30 supported by the housing 5 is opposed to a portion of the developer bearing member 15 in the downstream side of the developer supply region 29 but in the upstream side of the give-and-take region 23. Also, the plate 30 is spaced a small gap away from the developer bearing member so that the developer material to be transported into the give-and-take region 23 is regulated to a certain amount.

In operation of the developing device 3B so constructed, the developer material 31 is supplied from the developer supply member 27 onto the developer bearing member 15 in the developer supply region 29. The developer material 31 so supplied is retained on the outer peripheral surface of the developer bearing member 15 with the aid of the magnetic force of the magnetic member 17B and transported along the direction 19 as the roller 21 rotates. In addition, the developer material 31 on the developer bearing member 15 is then restricted to a certain amount by the restricting plate 30. The developer material 31 on the developer bearing member 15 forms magnetic brushes 33 (see FIG. 9) each extending along the magnetic lines generated by the magnetic member 17B.

Figure 7:
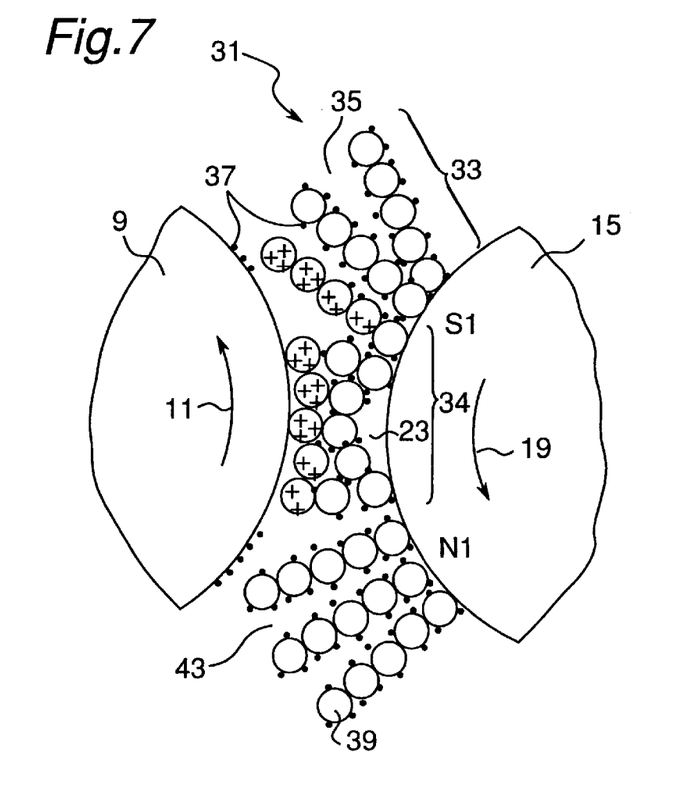
FIG. 7 is an enlarged sectional view showing a movement of toner particles between toner and developer bearing members.

Then, the developer material 31 is transported into the give-and-take region 23 where it is exposed to the magnetic field formed between the toner bearing member 9 and the developer bearing member 15. In this give-and-take region 23, particularly in the toner supply region 35 which is located on the upstream side of the region 23 with respect to the rotational direction 19 of the developer bearing member 15, the toner particles 37 negatively charged is attracted onto the toner bearing member 9 having a higher voltage than the developer bearing member 15. The carrier particles 39, on the other hand, remain on the developer bearing member 15 by the magnetic force of the magnetic member 17B. Also, the carrier particles deprived of toner particles still hold the positive charge therein.

The toner particles 37 so supplied to the toner bearing member 9 are transported with the rotation of the toner bearing member 9 in the direction 11 into the developing region 41 where some toner particles 37 are transferred onto the photosensitive member 1 to develop the electrostatic latent image into the visualized image. The remaining toner particles 37 that have not been transferred onto the photosensitive member 1 are then transported again into the give-and-take region 23.

In the give-and-take region 23, particularly in the region 43 located on the downstream side of the region 23 with respect to the rotational direction 19, the carrier particles 39 on the developer bearing member 15 that have been deprived of toner particles 37 in the upstream region 35 and having positive charge mechanically capture and electrically attract the toner particle 37 on the toner bearing member 9.

The toner particles 37 so collected onto the developer bearing member 15 is transported along with the carrier particles 39 by the rotation of the developer bearing member 15 in the direction 19 while the toner particles 37 are mixed again with the carrier particles 39. Then, the developer material 31 is advanced into the region to which the pair neighboring magnetic poles N2 and N3 confront. The neighboring magnetic poles N2 and N3 cooperate to form a repelling force in the region, releasing the developing material 31 from the developer bearing member 27. The released developer material 31 will be mixed into another developing material being mixed by the developer supply member 27.

It is clear from the above description that the toner particles 37 that have not used for developing in the developing region 41 are collected in the give-and-take region 23 from the toner bearing member 9 to the developer bearing member 15. The developer bearing member 15 releases the collected toner particles 37 as well as the carrier particles 39 and then is re-supplied with suitably mixed toner and carrier particles in the developer supply region 29. Therefore, no pattern corresponding to the previously developed image exists in a layer of toner particles on the toner bearing member, preventing the pattern from being superimposed on the visualized toner image on the photosensitive drum 1.

It can be understood from above that, to increase the supply and collect efficiency between the developer bearing member 15 and the toner bearing member 9, it is useful to increase the packing density in the give-and-take region 23. However, an excessive packing density may induce an accumulation of the developer material 31 at the entrance of the give-and-take region 23. Also, if the accumulation increases to a certain amount, the developer material may move out of the region within which the magnetic force can hold the developing material and then onto the toner bearing member 15, which may result in the developer material 31 to be transported into the developing region to disadvantageously prevent both rotations of the developer bearing member 15 and toner bearing member 9.

Figure 8A:
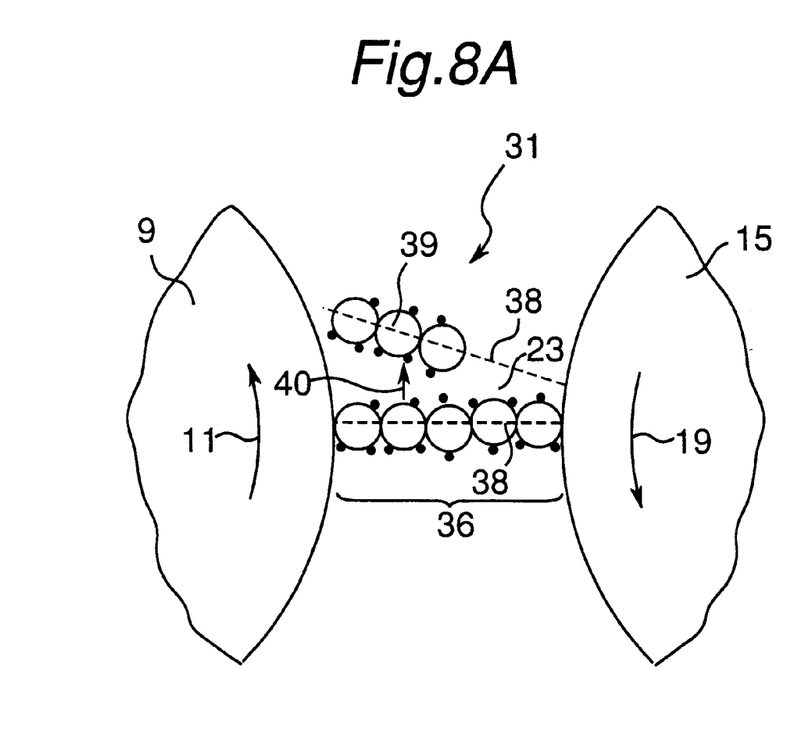
FIG. 8A shows magnetic lines and magnetic brushes both of which extend vertically from a developer bearing member.

For example, if one magnetic pole is disposed to oppose the give-and-take region 23, as shown in FIG. 8A, the magnetic line 38 formed in the closest portion of the developer bearing member 15 and the toner bearing member 9 extends approximately vertically from the surface of the developer bearing member 15. Also, the magnetic line 38 forms a chain-like magnetic brush 36 therealong. The magnetic brush 36 brings into contact with the toner bearing member 9 to receive a resistance therefrom in a direction 40 opposite to the rotational direction 19, thereby resulting in the accumulation of the developer material at the entrance of the give-and-take region 23. Also, the carrier particles may separate from the magnetic brush 36 to adhere to the toner bearing member 9.

Figure 8B:
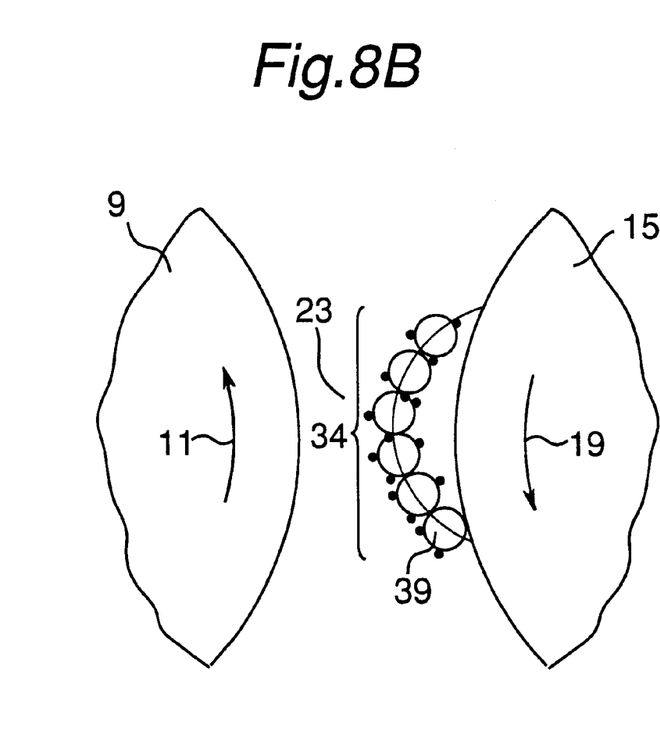
FIG. 8B shows magnetic lines and magnetic brushes both of which extend tangentially along a peripheral surface of the developer bearing member.

In the developing device 3B of the embodiment, however, no magnetic pole is disposed in the vicinity of the closest region of the magnetic bearing member and the toner bearing member, but the magnetic pole S1 is disposed on the upstream side of the give-and-take region 23 so that a region capable of magnetically retaining the developer material therein is extended, preventing the developer material or carrier particles from being transferred onto the toner bearing member. Also, as shown in FIG. 8B, the magnetic pole N1, which is disposed on the downstream side of the give-and-take region 23, cooperates with the magnetic pole S1 to form magnetic lines 42 extending along the tangential direction in the give-and-take region 23. Therefore, the carrier particles 39 form magnetic brushes each extending along the magnetic lines 42 in the tangential direction, which will lead a higher packing density in the give-and-take region 23. As a result, the magnetic brush 34 creates less contact with the toner bearing member 9 to keep its original shape than the magnetic brush 36 (see FIG. 8A) extending in the vertical direction in the give-and-take region 23.

According to the embodiment, even when the packing density is increased in the give-and-take region 23, the developer materials are allowed to be moved through the region 23 without being accumulated therein. Also, the carrier particle hardly separate from the brush to adhere to the toner bearing member 9. Further, any carrier particle that has undesirably separated from the brush and then adhered to the toner bearing member 9 will be collected by the contact of the magnetic brush 34 that can exert more powerful collecting force against the toner bearing member 9 than the vertically extending magnetic brush 36.

Also in this embodiment, the rotational speed of the developer bearing member 15 is equal to or more, most preferably 1.4 times or more, than that of the toner bearing member 9, allowing the toner particles to be supplied and collected more efficiently.

Further, although the electrical force that allows the toner particles to adhere or move to the toner bearing member 9 increases with the increase of the electrical charge of toner particles or of the voltage difference between the toner bearing member 9 and the developer bearing member 15, the toner particles on the toner bearing member 9 will be collected to the developer bearing member 15 in the give-and-take region 23 by increasing the rotational speed of the developer bearing member 15.

A test was conducted to observe the give-and-take of toner particles in the give-and-take region. In this test, the distance D between the toner bearing member and the developer bearing member was adjusted to 0.7 mm. The bias voltage of the toner bearing member was higher than that of developer bearing member by +200 volts and AC voltage having a frequency of 8 kilo-hertz and a peak-to-peak voltage of 2.6 kilo-volts was applied therebetween. The toner bearing member and the developer bearing member were rotated at respective velocities of 130 mm/sec and 182 mm/sec. The amount of charge of toner particles was adjusted to 5 $\mu$C/g and the packing density was designed to 34.4%. As a result, it was observed that the toner particles were well supplied and collected in the give-and-take region, reproducing a high quality image having a constant density.

Although, in this embodiment, the magnetic lines 42 extending in the tangential direction are formed by disposing the magnetic poles S1 and N1 on the upstream and downstream side of the give-and-take region 23, respectively, the invention is not limited thereto and the same or similar magnetic lines may be formed by other arrangement of the magnetic poles.

It is clear from the above description, according to the embodiment, the packing density will be increased in the give-and-take region between the toner bearing member and the developer bearing member. Also, the toner particles passed through the developing region will be collected efficiently from the toner bearing member to the developer bearing member. Further, the portion of the toner bearing member from which the toner particles are removed in the give-and-take region will be supplied with the toner particles from the developer bearing member. That is, the toner particles are supplied to and from the toner bearing member without using any scraping member.

In addition, the magnetic lines are generated in the tangential direction of the developer bearing member in the give-and-take region, along which the magnetic brushes are formed. Also, although the vertically extended magnetic brush will break its shape by the contact with the toner bearing member, the magnetic brush extending in the tangential direction will move past the give-and-take region with keeping its original shape even if it contacts with the toner bearing member, preventing the developer materials from accumulating in the give-and-take region and moving into the developing region.

Furthermore, the packing density in the give-and-take region can be increased, ensuring the magnetic brush to collect the toner and carrier particles from the toner bearing member to the developer bearing member even when the toner particles are highly charged.

Although the present invention has been fully described by way of examples with reference to the accompanying drawings, it is to be noted that various changes and modifications will be apparent to those skill in the art. Therefore, unless otherwise such changes and modifications depart from the scope of the present invention, they should be constructed as being included therein.

Also, the present disclosure relates to subject matter contained in Japanese Patent Application No. 8-283674, filed on October 25, and No. 9-28804, filed on February 13, which are expressly incorporated herein by references.

What is claimed is:

1. A developing device for use in an electrophotographic image forming a apparatus comprising:
    a developer material having toner particles and carrier particles, said toner and carrier particles being provided with electric charges of different polarities;
    a housing in which said developer material is housed;
    a first bearing member which is mounted in said housing to bear said developer material thereon; and
    a second bearing member which is mounted in said housing leaving a gap between said second bearing member and said first bearing member to form a give-and-take region through which said toner particles are transferred to and from said first bearing member;
    wherein a packing density in said give-and-take region is equal to or more than 29.5%, said packing density being defined by the following equation:

$$P.D=100(M/(D\rho))$$

wherein
   P.D: Packing density (%)
   M: Amount of developer material per unit area on said first bearing member (mg/cm$^2$)
   D: Distance between said first and second bearing members (cm)
   $\rho$: Unit weight of said developer material (g/cm$^3$).

2. A developing device claimed in claim 1, wherein said first bearing member includes a first roller capable of rotating in one direction and said second bearing member includes a second roller capable of rotating in said one direction, said first and second rollers being opposed to form said give-and-take region therebetween.

3. A developing device claimed in claim 2, wherein said first roller includes a plurality of magnetic poles fixed within said first roller.

4. A developing device claimed in claim 2, wherein said first roller rotates at a rotational speed that is about 1.4 times as large as that of said second roller.

5. A developing device claimed in claim 1, wherein said carrier particles are a magnetic material and said toner particles are a non-magnetic material.

6. A developing device claimed in claim 5, further comprises a device that forms an electric field between said first and second bearing members, said electric field being formed to force said charged toner particles from said first bearing member to said second bearing member.

7. A developing device claimed in claim 6, wherein said first bearing member includes a first roller capable of rotating in one direction and said second bearing member includes a second roller capable of rotating in said one direction, said first and second rollers being opposed to form said give-and-take region therebetween.

8. A developing device claimed in claim 7, wherein said first roller includes a plurality of magnetic poles fixed within said first roller.

9. A developing device claimed in claim 5, wherein said toner particles have a certain color other than black, and said packing density is equal to or more than 33.8%.

10. A developing device for use in an electrophotographic image forming apparatus, comprising:
    a developer material having toner particles and carrier particles, said toner and carrier particles being provided with electric charges of opposite polarities;
    a housing in which said developer material is housed;
    a plurality of magnetic poles fixed in said housing;
    a first bearing member which is rotatably mounted in said housing to bear said developer material thereon, said first bearing member surrounding said plurality of fixed magnetic poles; and
    a second bearing member which is mounted in said housing leaving a gap from said first bearing member to form a give-and-take region through which said toner particles are transferred to and from said first bearing member;
    wherein said plurality of magnetic poles include a first magnetic pole which is disposed on an upstream side of said give-and-take region with respect to a rotational direction of said first bearing member.

11. A developing device claimed in claim 10, wherein said first bearing member is a first roller capable of rotating in one direction and said second bearing member is second roller capable of rotating in said one direction, said first and second rollers being opposed to form said give-and-take region therebetween.

12. A developing device claimed in claim 11, wherein said plurality o magnetic poles include a second magnetic pole which is disposed on a downstream side of said give-and-take region with respect to said rotational direction of said first bearing member, said second magnetic pole having a certain polarity which is different from said first magnetic pole.

13. A developing device claimed in claim 10, wherein said first roller rotates at a rotational speed that is about 1.4 times as large as that of said second roller.

14. A developing device claimed in claim 10, wherein said carrier particles are a magnetic material and said toner particles are a non-magnetic material.

15. A developing device claimed in claim 10, further comprises a device that forms an electric field between said first and second bearing members, said electric field being formed to force said charged toner particles from said first bearing member to said second bearing member.

16. A developing device claimed in claim 10, wherein a packing density in said give-and-take region is equal to or more than 29.5%, said packing density being defined by the following equation:

$$P.D=100[M/(D\rho)]$$

wherein
   P.D: Packing density (%)
   M: Amount of developer material per unit area on said first bearing member (mg/cm$^2$)
   D: Distance between said first and second bearing members (cm)
   $\rho$: Unit weight of said developer material (g/cm$^3$).

17. A developing device for use in an electrophotographic image forming apparatus, comprising:
    a developer material having toner particles and carrier particles, said toner and carrier particles being provided with electric charges of different polarities;
    a housing in which said developer material is housed;
    a first bearing member which is mounted in said housing, said first bearing member including a roll-like first rotatable member and a plurality of magnetic poles disposed within said first rotatable member; and a second bearing member which is mounted in said housing, said second bearing member including a second rotatable member which is disposed to oppose said first bearing member leaving a gap therebetween to form a give-and-take region;

wherein said plurality of magnetic poles form magnetic lines that extend across said give-and-take region along a tangential direction of said roll-like first rotatable member.

18. A developing device claimed in claim 17, wherein said plurality of magnetic poles include a first and second magnetic poles having different polarities, said first magnetic pole being disposed adjacent to and on an upstream side of said give-and-take region with respect to a rotational direction of said roll-like first member and said second magnetic pole being disposed adjacent to and on a downstream side of said give-and-take region with respect to said rotational direction.

19. A developing device claimed in claim 18, further comprises a device that forms an electric field between said first and second bearing members, said electric field being formed to force said charged toner particles from said first bearing member to said second bearing member.

20. A developing device claimed in claim 19, wherein a packing density of said give-and-take region is equal to or more than 29.5%, said packing density being defined by the following equation:

$$P.D=100[M/(D\rho)]$$

wherein

P.D: Packing density (%)

M: Amount of developer material per unit area on said first bearing member (mg/cm$^2$)

D: Distance between said first and second bearing members (cm)

$\rho$: Unit weight of said developer material (g/cm$^3$).

* * * * *